United States Patent
Anezaki et al.

(10) Patent No.: US 9,563,389 B2
(45) Date of Patent: Feb. 7, 2017

(54) IMAGE PROCESSING SYSTEM, GATEWAY APPARATUS, SERVER APPARATUS, METHOD OF CONTROLLING GATEWAY APPARATUS, METHOD OF CONTROLLING SERVER APPARATUS, PROGRAM FOR CONTROLLING GATEWAY APPARATUS, AND PROGRAM FOR CONTROLLING SERVER APPARATUS WHEREIN THE JOB INCLUDES AN OPERATION RELATED TO THE JOB

(71) Applicant: Konica Minolta, Inc., Chiyoda-ku (JP)

(72) Inventors: Kazuya Anezaki, Itami (JP); Kazumi Sawayanagi, Itami (JP); Masami Yamada, Osaka (JP); Hisashi Uchida, Kyoto (JP); Akihiro Torigoshi, Itami (JP); Yasutaka Ito, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/666,726

(22) Filed: Mar. 24, 2015

(65) Prior Publication Data
US 2015/0277820 A1    Oct. 1, 2015

(30) Foreign Application Priority Data
Mar. 25, 2014    (JP) ................................. 2014-061040

(51) Int. Cl.
*G06F 3/12*    (2006.01)
*G06K 15/00*   (2006.01)

(52) U.S. Cl.
CPC ........... *G06F 3/1236* (2013.01); *G06F 3/1207* (2013.01); *G06F 3/1273* (2013.01); *G06F 3/1287* (2013.01)

(58) Field of Classification Search
CPC .... G06F 3/1236; G06F 3/1207; G06F 3/1273; G06F 3/1287
(Continued)

(56) References Cited

U.S. PATENT DOCUMENTS

| | | | |
|---|---|---|---|
| 7,290,060 B2 * | 10/2007 | Kong ................. | H04L 12/4641 370/352 |
| 2002/0080391 A1 | 6/2002 | Sugiura et al. | |

(Continued)

FOREIGN PATENT DOCUMENTS

| | | |
|---|---|---|
| JP | 2002-182866 A | 6/2002 |
| JP | 2008-59062 A | 3/2008 |

(Continued)

OTHER PUBLICATIONS

Office Action (Notice of Reasons for Rejection) issued on Feb. 16, 2016, by the Japanese Patent Office in corresponding Japanese Patent Application No. 2014-061040, and an English Translation of the Office Action. (8 pages).

*Primary Examiner* — Gabriel Garcia
(74) *Attorney, Agent, or Firm* — Buchanan Ingersoll & Rooney PC

(57) ABSTRACT

An image processing system includes: a server apparatus connected to a first network; an image processing apparatus connected to a second network; and a gateway apparatus, wherein the server apparatus includes: a transmitting unit configured to transmit job data of a job by the first communication protocol, the image processing apparatus being made to execute the job; and an adding unit configured to add content information to the job data, the content information indicating contents of the job, and the gateway apparatus includes: an analyzing unit; a determining unit; and an executing unit.

100 Claims, 9 Drawing Sheets

(58) Field of Classification Search
USPC ..... 358/1.1, 1.9, 1.13, 1.14, 1.15, 1.18, 402;
709/201, 203, 213, 226, 239, 249;
707/737; 726/12
See application file for complete search history.

(56) References Cited

U.S. PATENT DOCUMENTS

| | | | |
|---|---|---|---|
| 2005/0084113 A1* | 4/2005 | Simpson | H04L 63/029 380/270 |
| 2012/0254961 A1* | 10/2012 | Kim | H04L 12/66 726/7 |
| 2015/0358694 A1* | 12/2015 | Meng | H01R 12/7005 439/64 |

FOREIGN PATENT DOCUMENTS

| | | |
|---|---|---|
| JP | 2008-18193 A | 8/2008 |
| JP | 2012-133728 A | 7/2012 |

* cited by examiner

FIG. 5

```
        Job-Info-ImageLog: TRUE
    Job-Info-ImageLog-URI: http://192.168.x.x/hoge
    Job-Info-ImageLog-src: HP-PCL 6
    Job-Info-ImageLog-dst: jpeg
 Job-Info-ImageLog-offset: 20
```

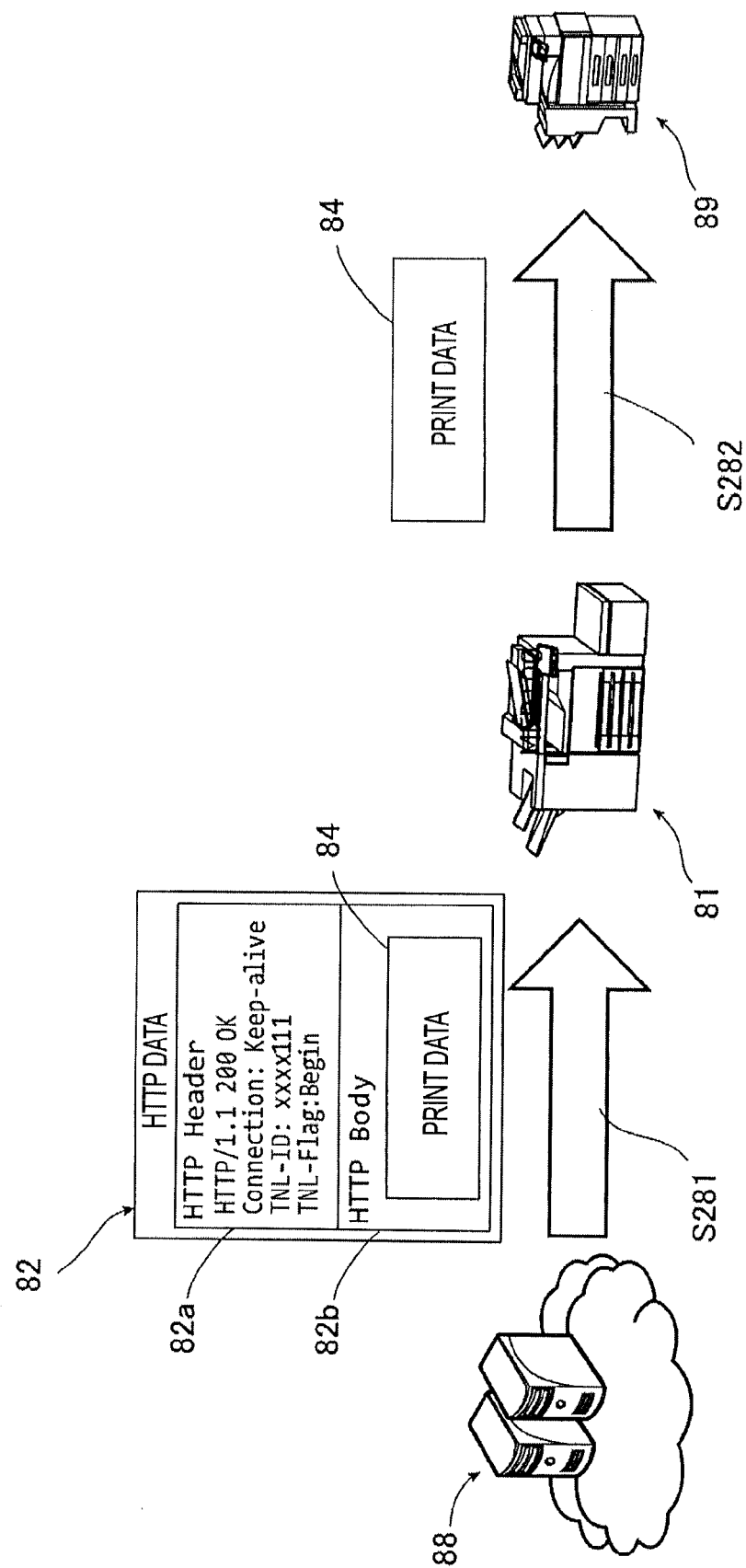

IMAGE PROCESSING SYSTEM, GATEWAY APPARATUS, SERVER APPARATUS, METHOD OF CONTROLLING GATEWAY APPARATUS, METHOD OF CONTROLLING SERVER APPARATUS, PROGRAM FOR CONTROLLING GATEWAY APPARATUS, AND PROGRAM FOR CONTROLLING SERVER APPARATUS WHEREIN THE JOB INCLUDES AN OPERATION RELATED TO THE JOB

The entire disclosure of Japanese Patent Application No. 2014-061040 filed on Mar. 25, 2014 including description, claims, drawings, and abstract are incorporated herein by reference in its entirety.

BACKGROUND OF THE INVENTION

Field of the Invention

The present invention relates to image processing systems, gateway apparatuses, server apparatuses, gateway apparatus control methods, server apparatus control methods, gateway apparatus control programs, and server apparatus control programs. More particularly, the present invention relates to an image processing system in which an image processing apparatus can execute a job based on job data transmitted from a server apparatus by HTTP, a gateway apparatus, the server apparatus, a method of controlling the gateway apparatus, a method of controlling the server apparatus, a program for controlling the gateway apparatus, and a program for controlling the server apparatus.

Description of the Related Art

Instead of server software that is operated by a server so as to reduce the server introduction/management costs in a LAN (Local Area Network), so-called cloud applications are now widely spread. When executed with the use of a so-called cloud server connected to the Internet, a cloud application can provide various kinds of services to a user.

In some cloud system that provides a cloud application in a usable form, the cloud application provides various kinds of services while communicating with devices such as MFPs (Multi-Function Peripherals) or printers that are operated in a LAN in each corporation. In an image forming system using such a cloud system, communication from the cloud application to a device is conducted. This communication is to access an MFP or the like in an intranet from the Internet. Therefore, due to the function of a so-called firewall normally located on a boundary between the Internet and an intranet, communication cannot be conducted in some cases. In an environment where private IP addresses are allocated to MFPs, for example, the IP address of an MFP cannot be designated from the cloud application side, and communication might not be possible. In view of this, a gateway apparatus that relays communication between an apparatus on the Internet side and a device in a LAN is used.

A gateway apparatus is constantly connected to a management server that can be connected thereto via the Internet, and generates an HTTP tunnel with an apparatus such as a cloud server on the Internet side based on a result of communication with the management server, for example, so that relayed communication between the apparatus on the Internet side and an image processing apparatus in a LAN can be established.

JP 2012-133728 A discloses the configuration of a printing system in which, in accordance with a printing instruction from a portable terminal, an information processing apparatus in a LAN converts print target data into a printer language that can be interpreted by an image forming apparatus in the same LAN. In this printing system, if there is an information processing apparatus having a printer language conversion function, the printing management server in the LAN transmits the address of the information processing apparatus to the portable terminal.

JP 2008-181193 A discloses an information management system in which an image forming apparatus is remotely managed by a management server. In this information management system, even when two or more instructions are issued, the management server generates a combined instruction from the two or more instructions, and transmits the combined instruction to the image forming apparatus.

FIG. 9 is a diagram for explaining a relaying operation to be performed by a conventional gateway apparatus.

In the example case shown in FIG. 9, print data 84 is transmitted from a cloud server 88 to an MFP 89 via a gateway apparatus 81.

Specifically, in step S281, the cloud server 88 transmits HTTP data 82 including the print data 84 to the gateway apparatus 81 through an HTTP tunnel. The HTTP data 82 includes an HTTP header 82a and an HTTP body 82b, and the print data 84 is included in the HTTP body 82b, for example.

After the HTTP data 82 is transmitted, the gateway apparatus 1 in step S282 analyzes the HTTP data 82, and transmits the print data 84 included in the HTTP data 82 to the MFP 89. The MFP 89 performs printing based on the print data 84. As described above, as the gateway apparatus 1 relays the data transmitted from the cloud server 88 to the MFP 89, the MFP 89 can perform printing. In this case, the print data 84 may be transmitted as the HTTP body 82b to the MFP 89.

Where an image forming apparatus in a LAN performs printing from a cloud application, there is a demand for a print log server that is provided in the LAN or the like and records a print log. As the images that have been formed by the image forming apparatus in the LAN are recorded as a print log into the print log server, the management operation can be readily performed later on the image forming system.

In a case where a print log server records a print log, a cloud application causes an information forming apparatus to perform a print log transfer function by adding a print log transfer request to the print job information to be transmitted to the image forming apparatus, for example. However, if the image forming apparatus that performs printing is not capable of performing the print log transfer function, information is not transmitted to the print log server, and therefore, appropriate print log recording is not performed.

So as to solve such a problem, the function information about each image forming apparatus may be stored into the cloud server. A user manually registers the function information in the cloud server, or the cloud server requests the function information from each image forming apparatus and receives the function information in reply. In this manner, the function information can be stored into the cloud server. The cloud server checks the function information stored therein. If the target image forming apparatus does not have the print log transfer function, the cloud server can notify the terminal that has issued the printing instruction of the error, or present a substitute image forming apparatus having the print log transfer function.

In such a system in which the cloud server holds the function information about each image forming apparatus, however, the amount of information being handled by the cloud server is enormous, as the cloud server manages the function information about the image forming apparatuses from all over the world. Therefore, the costs for the construction and maintenance of the cloud server are increased.

In other cases, the function information about the image forming apparatuses in a LAN may be held by a gateway apparatus that is provided in the same LAN. In this case, a user manually registers the function information in the gateway apparatus, or the gateway apparatus requests the function information from each image forming apparatus and receives the function information in reply. In this manner, the function information about each information apparatus can be stored into the gateway apparatus. If the target image forming apparatus does not have the print log transfer function, the gateway apparatus can notify the cloud server or the management server of the error so that the terminal that has issued the printing instruction will be notified of the error, or present a substitute image forming apparatus having the print log transfer function. Alternatively, the gateway apparatus may perform the print log transfer function.

However, such a system in which a gateway apparatus holds the function information has the following problem. The gateway apparatus performs a relaying operation by transmitting data transmitted from the cloud application to an image forming apparatus as it is. Since the information in a print job is not interpreted by the gateway apparatus, the gateway apparatus cannot determine whether the print job requests print log transfer.

SUMMARY OF THE INVENTION

The present invention has been made to solve the above problems, and an object thereof is to provide an image processing system in which an appropriate apparatus can be made to perform a predetermined process in accordance with information included in data being relayed by a gateway apparatus, the gateway apparatus, a server apparatus, a method of controlling the gateway apparatus, a method of controlling the server apparatus, a program for controlling the gateway apparatus, and a program for controlling the server apparatus.

To achieve the abovementioned object, according to an aspect, an image processing system reflecting one aspect of the present invention comprises: a server apparatus connected to a first network; an image processing apparatus connected to a second network; and a gateway apparatus configured to connect the second network to the first network, perform mutual conversion between a first communication protocol being used in the first network and a second communication protocol being used in the second network, and relay communication between the server apparatus and the image processing apparatus, wherein the server apparatus includes: a transmitting unit configured to transmit job data of a job by the first communication protocol, the image processing apparatus being made to execute the job; and an adding unit configured to add content information to the job data, the content information indicating contents of the job, and the gateway apparatus includes: an analyzing unit configured to analyze the job data and acquire the content information; a determining unit configured to determine whether the image processing apparatus is capable of executing the job based on the content information; and an executing unit configured to execute an operation related to the job based on a result of the determination performed by the determining unit.

The first communication protocol is preferably HTTP (hypertext transfer protocol), and the adding unit preferably adds the content information to the HTTP header of the job data.

The image processing system preferably further includes a log server connected to the first network or the second network. The job preferably includes a transfer job to transfer information about the image to be formed by the image processing apparatus, to the log server. When the image processing apparatus is not capable of executing the transfer job, the executing unit preferably acquires print data from the job data, transmits the acquired print data to the image processing apparatus, and transmits the print data or the data corresponding to the print data to the log server.

The gateway apparatus preferably further includes an image generating unit that generates image data from the print data, the content information preferably includes information about the format of the print data and the format of the image data to be generated, the image generating unit preferably generates the image data from the print data based on the content information, and the executing unit preferably transmits the image data generated by the image generating unit to the log server.

The content information preferably includes information about the location of the print data in the job data, and the executing unit preferably acquires the print data from the job data based on the information about the location of the print data.

The image processing system preferably further includes a management apparatus connected to the first network, wherein the gateway apparatus preferably further includes an establishing unit that creates an HTTP tunnel leading to the server apparatus and establishes a communication session between the server apparatus and the image processing apparatus, when a communication start request is transmitted from the management apparatus.

The gateway apparatus preferably further includes: an acquiring unit that acquires information about another image processing apparatus when the determining unit determines the image processing apparatus not to be capable of executing the job, the another image processing apparatus being connected to the second network and being capable of executing the job; and a transmitting unit that transmits the information acquired by the acquiring unit to the management apparatus or the server apparatus.

The gateway apparatus is preferably an image forming apparatus that has an image formation function.

To achieve the abovementioned object, according to an aspect, a gateway apparatus that connects a second network to a first network, performs mutual conversion between a first communication protocol being used in the first network and a second communication protocol being used in the second network, and relays communication between a server apparatus connected to the first network and an image processing apparatus connected to the second network, the gateway apparatus reflecting one aspect of the present invention comprises: an analyzing unit that analyzes job data transmitted from the server apparatus and acquires content information indicating the contents of the job data; a determining unit that determines whether the image processing apparatus is capable of executing the job based on the content information; and an executing unit that executes an operation related to the job based on a result of the determination performed by the determining unit.

To achieve the abovementioned object, according to an aspect, a server apparatus that is connected to a first network in which a first communication protocol is used, and communicates with an image processing apparatus provided in a second network in which a second communication protocol is used, the server apparatus communicating with the image processing apparatus via a gateway apparatus performing mutual conversion between the first communication protocol and the second communication protocol, the gateway apparatus being provided in the second network, the server apparatus reflecting one aspect of the present invention comprises: a transmitting unit that transmits the job data of a job by the first communication protocol, the image processing apparatus being made to execute the job; and an adding unit that adds content information to the job data, the content information indicating the contents of the job.

To achieve the abovementioned object, according to an aspect, a method of controlling a gateway apparatus that connects a second network to a first network, performs mutual conversion between a first communication protocol being used in the first network and a second communication protocol being used in the second network, and relays communication between a server apparatus connected to the first network and an image processing apparatus connected to the second network, reflecting one aspect of the present invention comprises: an analyzing step of analyzing job data transmitted from the server apparatus and acquiring content information indicating the contents of the job data; a determining step of determining whether the image processing apparatus is capable of executing the job based on the content information; and an executing step of executing an operation related to the job based on a result of the determination performed in the determining step.

To achieve the abovementioned object, according to an aspect, a method of controlling a server apparatus that is connected to a first network in which a first communication protocol is used, and communicates with an image processing apparatus provided in a second network in which a second communication protocol is used via a gateway apparatus that is provided in the second network and performs mutual conversion between the first communication protocol and the second communication protocol, reflecting one aspect of the present invention comprises: a transmitting step of transmitting the job data of a job by the first communication protocol, the image processing apparatus being made to execute the job; and an adding step of adding content information to the job data, the content information indicating the contents of the job.

To achieve the abovementioned object, according to an aspect, a non-transitory recording medium storing a computer readable program for controlling a gateway apparatus that connects a second network to a first network, performs mutual conversion between a first communication protocol being used in the first network and a second communication protocol being used in the second network, and relays communication between a server apparatus connected to the first network and an image processing apparatus connected to the second network, reflecting one aspect of the present invention causes a computer to carry out: an analyzing step of analyzing job data transmitted from the server apparatus and acquiring content information indicating the contents of the job data; a determining step of determining whether the image processing apparatus is capable of executing the job based on the content information; and an executing step of executing an operation related to the job based on a result of the determination performed in the determining step.

To achieve the abovementioned object, according to an aspect, a non-transitory recording medium storing a computer readable program for controlling a server apparatus that is connected to a first network in which a first communication protocol is used, and communicates with an image processing apparatus provided in a second network in which a second communication protocol is used via a gateway apparatus that is provided in the second network and performs mutual conversion between the first communication protocol and the second communication protocol, reflecting one aspect of the present invention causes a computer to carry out: a transmitting step of transmitting the job data of a job by the first communication protocol, the image processing apparatus being made to execute the job; and an adding step of adding content information to the job data, the content information indicating the contents of the job.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 is a diagram showing an example of content information;

FIG. 9 is a diagram for explaining a relaying operation to be performed by a conventional gateway apparatus.

DESCRIPTION OF THE PREFERRED EMBODIMENTS

Hereinafter, an example of an image forming system that uses a gateway apparatus according to an embodiment of the present invention will be described with reference to the drawings. However, the scope of the invention is not limited to the illustrated examples.

The image forming system utilizes a so-called cloud computing technology. For example, an output from an image forming apparatus in an intranet located in a predetermined LAN (local area network) or the like can be transmitted from an external terminal via the Internet. Also, information obtained by an image forming apparatus in an intranet, for example, can be acquired or viewed with an external terminal via the Internet. On the Internet side, a cloud server that provides such services and a management server that manages the information for connecting the cloud server and the intranet are provided. On the intranet side, a gateway apparatus that performs a relay function for communication with the Internet is provided.

An image forming apparatuses that function as the gateway apparatus, and image forming apparatuses that function as image processing apparatuses that communicate with the cloud server may be monochrome/color copying machines, printers, or facsimile machines, for example. Alternatively, these image forming apparatuses may be MFPs (Multi-Function Peripherals) each having a scan function, a copy function, a function of a printer, a facsimile function, a data communication function, and a server function. The scan function is a function to read an image from an original placed in a predetermined position, and store the image into a HDD (Hard Disk Drive) or the like. The copy function is a function to print the image onto a paper sheet or the like. The function of a printer is a function to perform printing on a paper sheet in accordance with a printing instruction received from an external terminal such as a PC. The facsimile function is a function to receive facsimile data from an external facsimile machine or the like and store the facsimile data into the HDD or the like. The data communication function is a function to transmit and receive data to and from a connected external device. The server function is a function to enable users to share the data stored in the HDD or the like.

Embodiments

Figure 1:
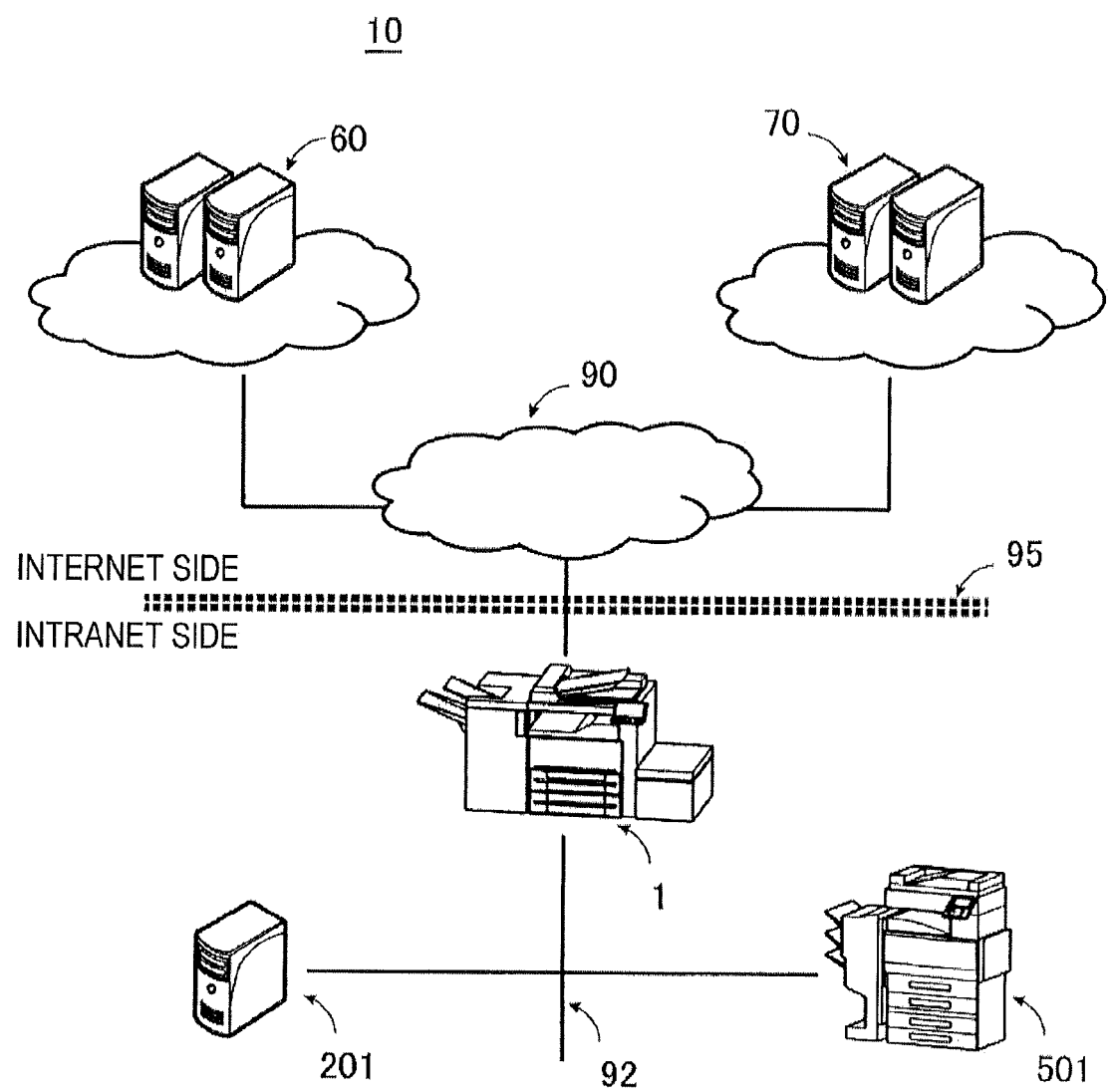
FIG. 1 is a diagram showing the configuration of an image forming system according to an embodiment of the present invention.

FIG. 1 is a diagram showing the configuration of an image forming system according to an embodiment of the present invention.

As shown in FIG. 1, the image forming system (an example of the image processing system) 10 is roughly divided into a group of apparatuses located on the Internet (an example of the first network) side and a group of apparatuses located on the intranet (an example of the second network) side.

On the Internet side of the image forming system 10, a cloud server (an example of the server apparatus) 60 and a management server (an example of the management apparatus) 70 are provided. The cloud server 60 and the management server 70 can communicate with each other by using HTTP (an example of the first communication protocol) through the Internet 90.

The configuration including the cloud server 60, the management server 70, and the like is merely an example of a cloud system abstractly shown in terms of the respective functions, and, in reality, there are various kinds of specific configurations that realize such functions.

On the intranet side of the image forming system 10, a gateway-included MFP (hereinafter also referred to simply as the gateway apparatus) 1, an image log server (hereinafter also referred to simply as the log server) 201, and an MFP (an example of the image processing apparatus) 501 are provided. The gateway apparatus 1, the log server 201, and the MFP 501 are connected to one another by a LAN, and constitute an intranet 92. The gateway apparatus 1 is connected to the Internet 90 via a so-called firewall 95. The log server 201 and the MFP 501 can access apparatuses in the Internet 90 via the gateway apparatus 1.

Figure 2:
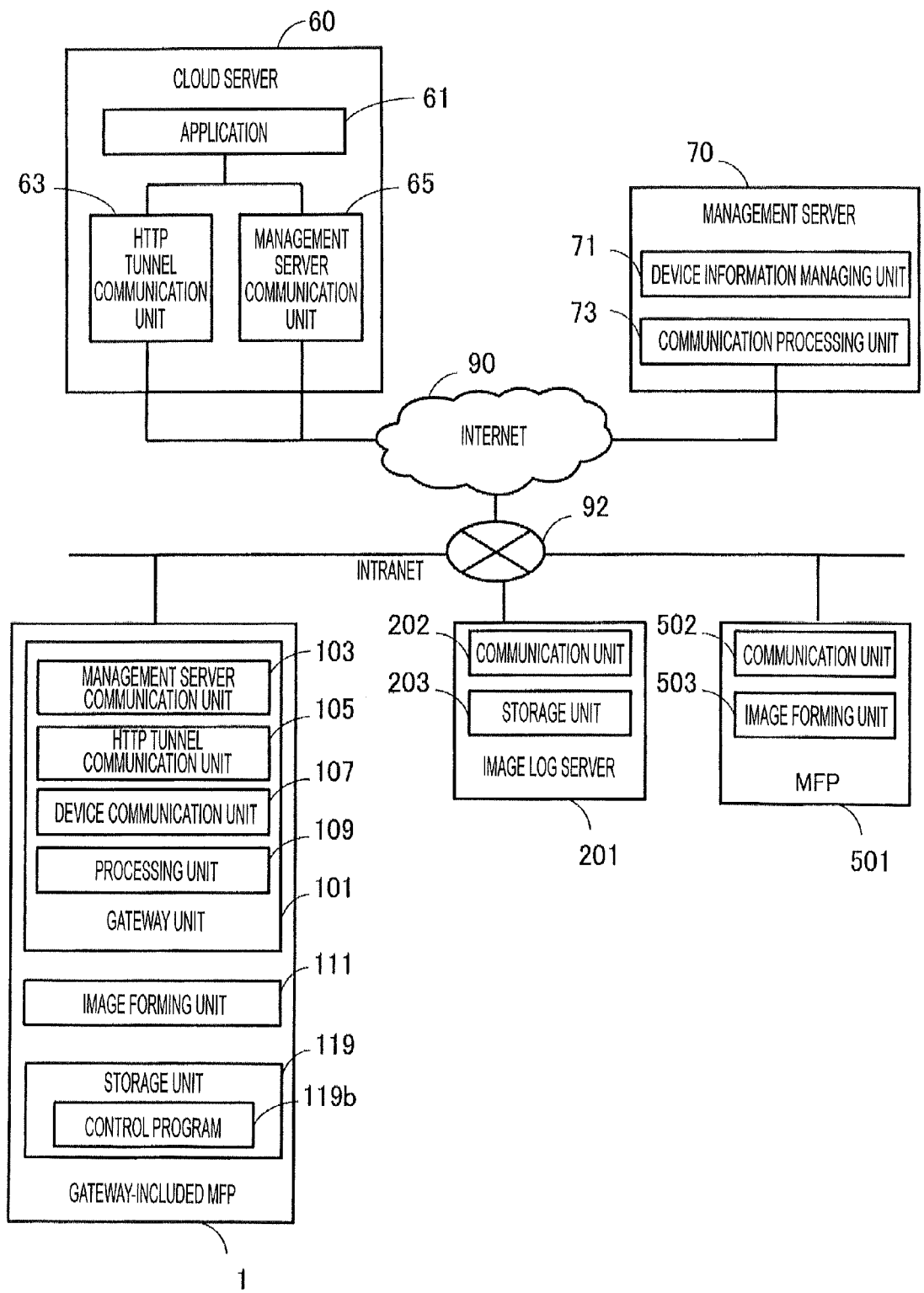
FIG. 2 is a block diagram showing the image forming system.

FIG. 2 is a block diagram showing the configuration of the image forming system 10.

As shown in FIG. 2, the cloud server 60 causes a cloud application (an example of a control program: also referred to simply as the application) 61 to operate on a cloud application platform to perform various control operations. The cloud server 60 includes an HTTP tunnel communication unit 63 and a management server communication unit 65, and can communicate with an external device via the Internet 90.

The management server 70 includes a device information managing unit 71 and a communication processing unit 73. By virtue of the communication processing unit 73, the management server 70 can communicate with an external device via the Internet 90 The management server 70 is constantly connected to the gateway apparatus 1, and the device information managing unit 71 manages information about the MFP 501 and the like, with which the cloud server 60 is to communicate. A device that is to communicate with devices including the MFP 501 can communicate with these devices based on the information being managed by the management server 70.

The MFP 501 includes a communication unit 502 and an image forming unit 503. The communication unit 502 performs control on communication between the MFP 501 and the cloud server 60 or the like.

The log server 201 includes a communication unit 202 and a storage unit 203. The log server 201 is connected to the intranet 92 through the communication unit 202. The log server 201 receives information transmitted from another apparatus via the intranet 92, and stores the information into the storage unit 203. Specifically, when logging data related to a print job is transmitted from the MFP 501 or the gateway apparatus 1, for example, the log server 201 receives the logging data and records the logging data as a print log into the storage unit 203. In this embodiment, the logging data includes image data corresponding to the image to be printed. The print log is recorded with the image data, the manager or the like of the image forming system 10 can readily check what kind of image is formed.

Roughly speaking, the gateway apparatus 1 is an MFP that includes a gateway unit 101, an image forming unit 111, and a storage unit 119. Specifically, in the gateway apparatus 1, the image forming unit 111 executes a print job, to form an image on a paper sheet and output the image.

Various kinds of data to be used when the gateway apparatus 1 operates are stored in the storage unit 119. For example, a control program 119b is stored in the storage unit 119. As a CPU (not shown) operates based on the control program 119b, the gateway apparatus 1 performs various operations.

The gateway unit 101 includes a management server communication unit 103, an HTTP tunnel communication unit 105, a device communication unit 107, and a processing unit 109, for example. The gateway apparatus 1 communicates with the cloud server 60 or controls communication between the cloud server 60 and the MFP 501 or the like based on an operation performed by the HTTP tunnel communication unit 105, the device communication unit 107, the processing unit 109, or the like. The gateway apparatus 1 also communicates with the management server 70 based on an operation performed by the management server communication unit 103. By doing so, the gateway apparatus 1 can relay communication between the cloud server 60 and the MFP 501 or the like (the relay function).

[Description of Relayed Communication Via the Gateway Apparatus 1]

Next, relayed communication to be performed via the gateway apparatus 1 is described. In a case where communication is to be performed between the cloud server 60 and the MFP 501, for example, the gateway apparatus 1 performs communication control in the manner described below, and relays the communication between the cloud server 60 and the MFP 501. As a result, communication can be performed between the cloud server 60 and the MFP 501

Figure 3:
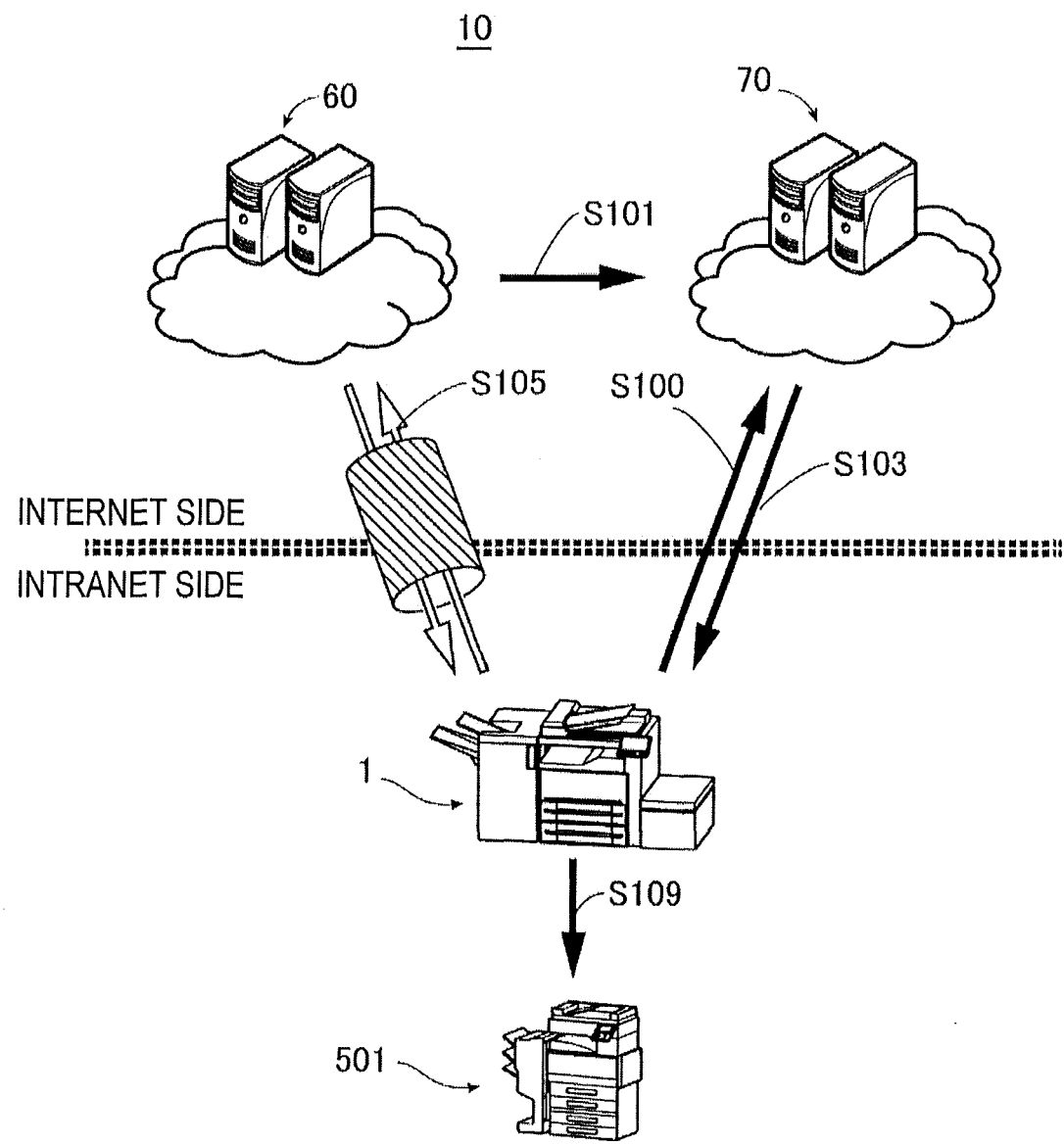
FIG. 3 is a diagram for explaining a relay function to be performed by a gateway apparatus.

FIG. 3 is a diagram for explaining the relay function to be performed by the gateway apparatus 1.

As shown in FIG. 3, in the image forming system 10, the gateway apparatus 1 in step S100 generates a message session with the management server 70 mainly at a time of its activation. At the same time, the gateway apparatus 1 also transmits the identification information about the MFP 501 that can be connected to the gateway apparatus 1, to the management server 70. The message session is generated in a protocol such as XMPP (Extensible Messaging and Presence Protocol). After the message session is generated, a constant connection state is maintained, and therefore, a keep-alive (keepalive) packet is repeatedly transmitted at reasonable intervals.

In step S101, the application 61 of the cloud server 60 requests a connection from the management server 70, so as to communicate with the MFP 501.

In step S103, the management server 70 transmits a tunnel connection request to the gateway apparatus 1 through the message session.

In step S105, upon receipt of the tunnel connection request, the gateway apparatus 1 establishes an HTTP session to connect the cloud server 60 and the gateway apparatus 1 in accordance with the tunnel connection request. The gateway apparatus 1 relays communication between the cloud server 60 and the MFP 501 via the HTTP session established in the above manner. That is, using the HTTP session as a tunnel, the application 61 can transmit data without being affected by a firewall or the like.

In step S109, the gateway apparatus 1 transmits the data received from the application 61 to the MFP 501. The gateway apparatus 1 also transmits data received from the MFP 501 to the application 61. In this manner, relayed communication using the relay function performed by the gateway apparatus 1 is conducted between the cloud server 60 being operated by the application 61 and the MFP 501.

Such communication is conducted in a case where a terminal (not shown) such as a PC or a portable terminal connected to the Internet 90 uses the application 61 provided by the cloud server 60, to designate the MFP 501 and output an image, for example. More specifically, an output is generated with the use of the MFP 501 based on document data held by a terminal, for example. In this case, the document data and an instruction to output the document data with the use of the MFP 501 are transmitted from the terminal to the application 61. As a result, the application 61 operates in the above described manner, relayed communication between the cloud server 60 and the MFP 501 is enabled by virtue of the relay function of the gateway apparatus 1, and the document data and an output instruction are transmitted from the cloud server 60 to the MFP 501. When the output is completed, information to that effect is transmitted from the MFP 501 to the cloud server 60, and the application 61 notifies the terminal of the completion of the output. In this manner, the terminal can generate an output using the MFP 501 through the application 61.

[Print Log Transfer Function]

In the image forming system 10, a log about printing performed at the MFP 501 or the like can be stored in the log server 201 with the use of a print log transfer function. This print log transfer function is performed by the application 61 transmitting information (a print log transfer request: an example of the job content information) that requests execution of a print log transfer job (hereinafter also referred to simply as the transfer job), when transmitting data of a print job. That is, when the application 61 of the cloud server 60 transmits data of a print job by HTTP, the print log transfer function becomes effective, as predetermined content information to the effect that the data of the print job is to be subjected to the transfer job is added to the data of the print job.

Figure 4:
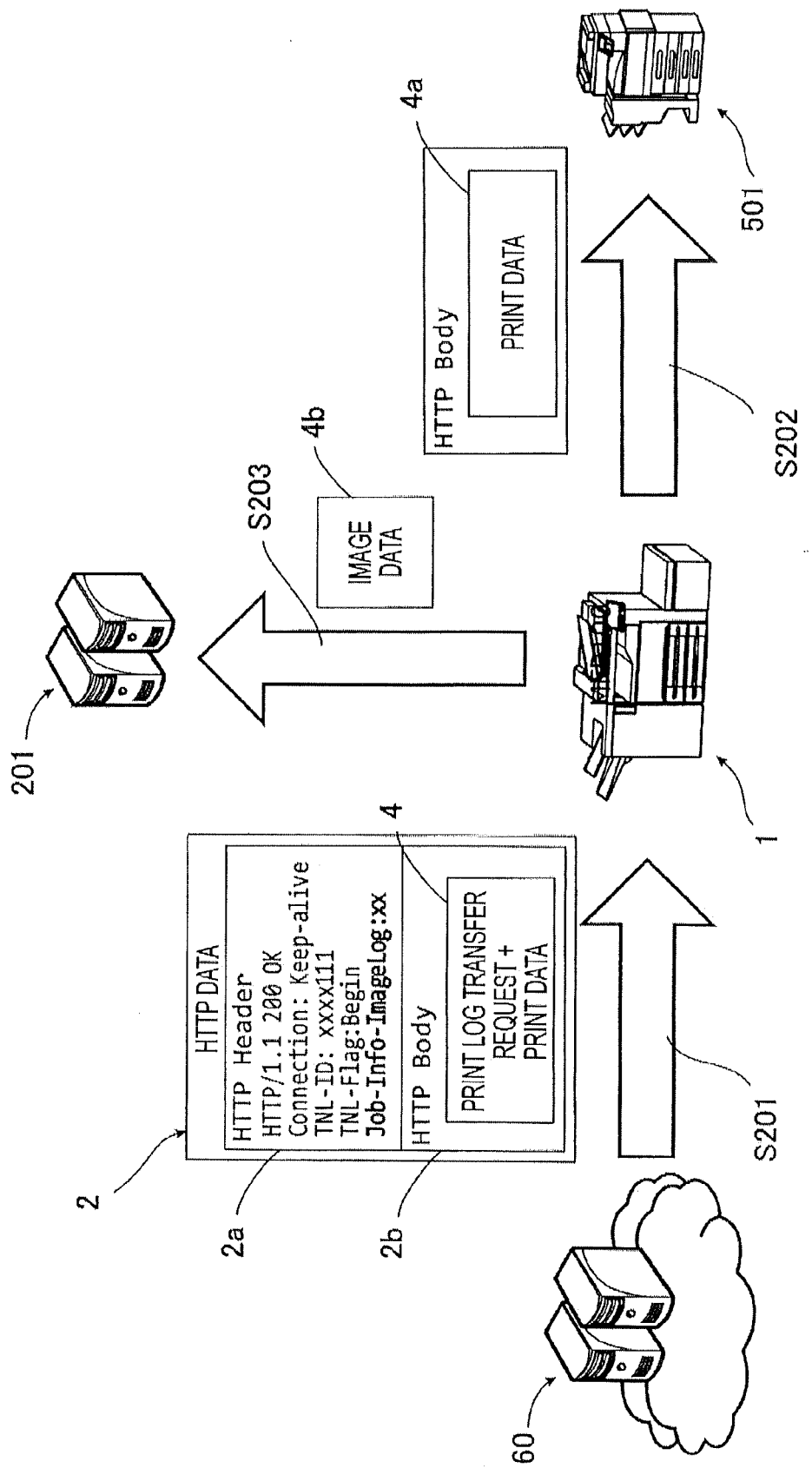
FIG. 4 is a diagram for explaining a print log transfer function.

FIG. 4 is a diagram for explaining the print log transfer function.

As shown in FIG. 4, in step S201, the cloud server 60 transmits HTTP data (an example of the job data) 2 to the gateway apparatus 1 through an HTTP tunnel that has been established in the above described manner. The HTTP data 2 is roughly divided into an HTTP header (hereinafter also referred to simply as the header) 2*a* and an HTTP body (hereinafter also referred to simply as the body) 2*b*. The body 2*b* includes job execution information 4. The header 2*a* includes various kinds of information for conducting communication by HTTP. For example, the header 2*a* includes a header that is included as default in a protocol for declaring continuation of a connection, a tunnel communication header including an ID for identifying an HTTP tunnel and communication codes, and the like.

In this embodiment, a transfer job needs to be executed together with a print job. Therefore, the job execution information 4 includes a print log transfer request as well as print data. The print log transfer request includes information indicating the location of the log server 201, and information about the image format or the like for storage in the log server 201, for example. However, the print log transfer request is not limited to the above.

In this embodiment, when the print log transfer function is used, the predetermined content information is added to the header 2*a*. The predetermined content information indicates the contents of the transfer job so that the transfer job is executed by an apparatus on the side of the intranet 92. That is, the print log transfer request about the transfer job is included in both the header 2*a* and the job execution information 4. The content information is added as a uniquely-extended header to the header 2*a*. Specifically, the content information is added as the header described below, for example.

FIG. 5 is a diagram showing an example of the content information.

When the print log transfer function is used, a header field that includes the field names and field values described below is added to the header 2*a*, for example. The gateway apparatus 1 and the MFP 501 are designed to be capable of interpreting such a header field.

As shown in FIG. 5, "Job-Info-ImageLog: TRUE" indicates that the job is to enable the print log transfer function "Job-Info-ImageLog-URI: http://192.168.x.x/hoge" indicates the URI (Uniform Resource Identifier) of the destination of the transfer of the print log. For example, the URI of the log server 201 in the intranet 92 is designated. Alternatively, a server connected to the Internet 90 may be selected as the destination of the transfer of the print log.

"Job-Info-ImageLog-src: HP-PCL 6" indicates the format of the data of the print job. In this example, "Job-Info-ImageLog-src: HP-PCL 6" indicates that the data is written in a page description language "HP-PCL 6".

"Job-Info-ImageLog-dst: jpeg" indicates the image format for storage in the log server 201. In this example, JPEG format is designated as the image format.

"Job-Info-ImageLog-offset: 30" is information about the location of the print data in the job execution information 4 of the body 2*b*, and more specifically, indicates the data length of the "print log transfer request". Here, the unit is byte. That is, in this example, 0th through 30th bytes in the job execution information 4 represent the print log transfer request, and the 31st and later bytes (the portion that is offset by the amount equivalent to 30 bytes) in the job execution information 4 represent the print data corresponding to the image to be printed.

The pattern of the field names and the possible values of the respective headers in the content information is not limited to the above, and may be set as appropriate.

The application 61 adds the content information about the location of the log server 201 or the like based on information about the intranet 92. The information about the intranet 92 is being managed in the management server 70. The information being managed in the management server 70 can be set as appropriate by the manager of the image forming system 10, for example.

Referring back to FIG. 4, when the HTTP data 2 is transmitted from the cloud server 60 to the gateway apparatus 1, the gateway apparatus 1 analyzes the HTTP data 2. That is, the gateway apparatus 1 analyzes the header 2a of the HTTP data 2, and acquires the content information. Based on the acquired content information, the gateway apparatus 1 determines whether the MFP 501 as the relay destination can execute the job. Specifically, the content information is assumed to indicate that the job is to enable the print log transfer function as described above (with a print log transfer request being included). At this point, the gateway apparatus 1 determines whether the MFP 501 is an apparatus capable of executing the transfer job. If the MFP 501 is not an apparatus capable of executing the transfer job, the operation described below is performed.

In step S202, the gateway apparatus 1 acquires print data 4a from the HTTP data 2, and transmits the print data 4a to the MFP 501 by TCP (Transmission Control Protocol: an example of the second communication protocol), which is used in the intranet 92. Here, the print data 4a may be transmitted for each portion of the body 2b, or only the print data 4a may be transmitted. With this, the MFP 501 forms an image on a paper sheet or the like based on the print data 4a, and executes the print job.

Since the content information includes offset information indicating the location of the print data 4a as described above, the gateway apparatus 1 can easily extract the print data 4a from the job execution information 4 by removing the portion of the print log transfer request from the job execution information 4 based on the offset information, without closely analyzing the contents of the job execution information 4. Accordingly, the processing load on the gateway apparatus 1 becomes smaller.

Meanwhile, in step S203, the gateway apparatus 1 in place of the MFP 501 executes the transfer job based on the content information. Specifically, the gateway apparatus 1 generates, from the print data 4a, the image data 4b corresponding to the print data 4a based on information about the format of the print data 4a and information about the format of the image data 4b, the information being included in the content information. For example, when the above described content information shown in FIG. 5 is added to the HTTP data 2, the gateway apparatus 1 generates the image data 4b in JPEG format. The generated image data 4b is then transmitted to the log server 201. The log server 201 in turn records the print log about the print job executed at the MFP 501.

A case where the MFP 501 is an apparatus capable of executing the transfer job has been described so far. In a case where an MFP 501b capable of executing the transfer job executes the print job, the operation described below is performed, for example.

Figure 6:
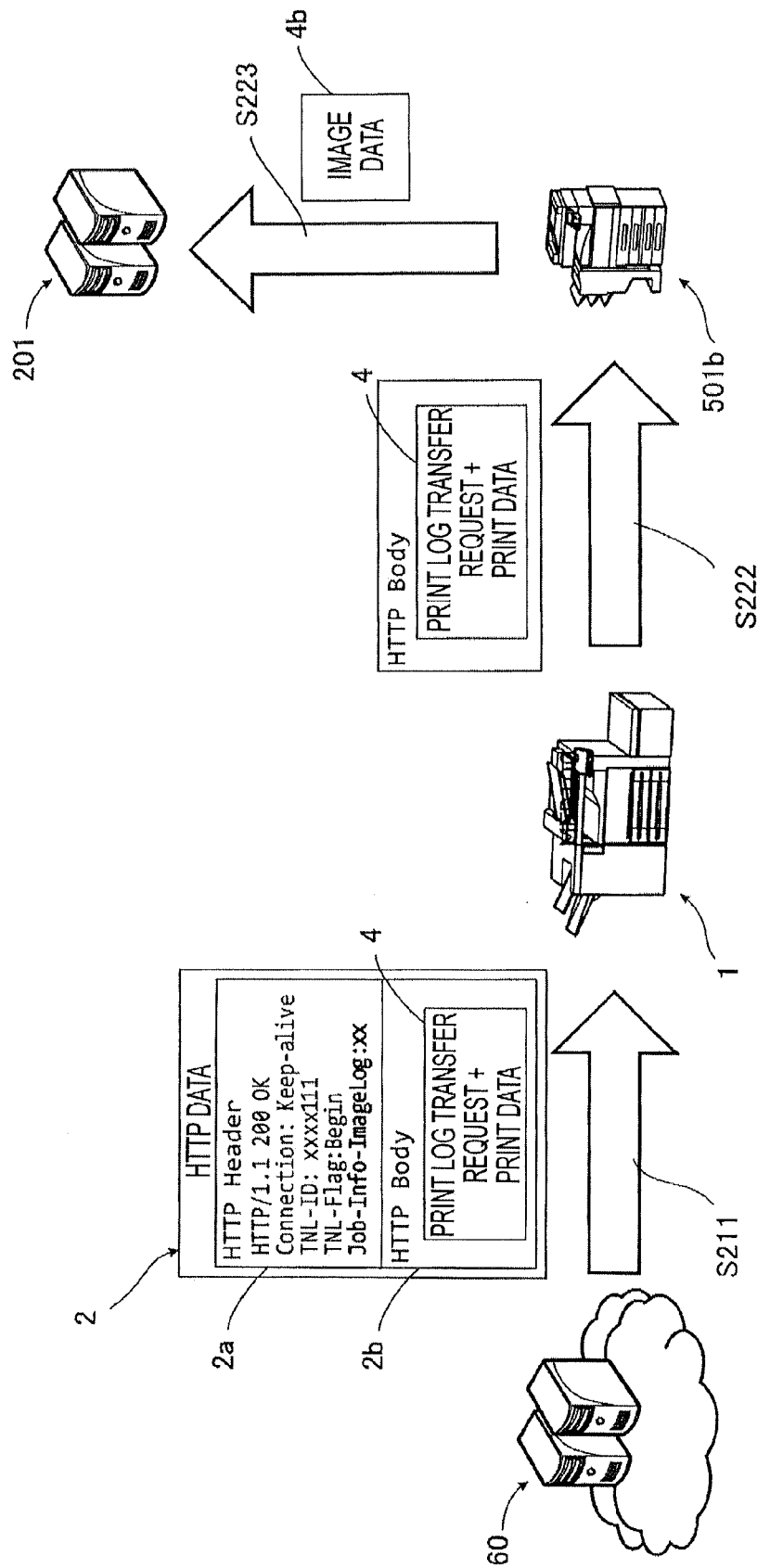
FIG. 6 is a diagram for explaining another example of the print log transfer function.

FIG. 6 is a diagram for explaining another example of the print log transfer function.

In the example shown in FIG. 6, a print job is sent from the cloud server 60 to the MFP 501b capable of executing a transfer job. Step S211 is carried out in the same manner as the above described step S201.

When the HTTP data 2 is transmitted from the cloud server 60 to the gateway apparatus 1, the gateway apparatus 1 analyzes the HTTP data 2, and determines whether the MFP 501b as the destination of the relay is capable of executing the job. Specifically, in a case where the content information in the header 2a indicates that the job is to enable the print log transfer function, a check is made to determine whether the MFP 501b is an apparatus capable of executing the transfer job together with the print job.

Since the MFP 501b is capable of executing the transfer job, the gateway apparatus 1 in step S222 transmits the body 2b of the HTTP data 2 to the MFP 501b. Here, only the job execution information 4 may be transmitted, or the print log transfer request and the print data in the job execution information 4 may be transmitted separately from each other.

After the body 2b including the job execution information 4 is transmitted to the MFP 501b, the MFP 501b forms an image on a paper sheet or the like and executes a print job based on the print data included in the job execution information 4.

In step S223, the MFP 501b generates the image data 4b corresponding to the print data based on the print log transfer request included in the job execution information 4, and transfers the generated image data 4b to the log server 201. For example, the image data 4b in JPEG format is generated based on the print log transfer request, and is transmitted to the log server 201. The log server 201 records the transmitted image data 4b incorporated into the print log.

As described above, the gateway apparatus 1 executes the transfer job depending on whether the apparatus executing the print job is capable of executing the transfer job. However, the present invention is not limited to that. For example, even in a case where the apparatus executing the print job is capable of executing the transfer job, the gateway apparatus 1 may execute the transfer job. Even in a case where the apparatus executing the print job has the print log transfer function, if the load on the apparatus is large, the apparatus may be determined not to be capable of executing the transfer job, and the gateway apparatus 1 may execute the transfer job.

Figure 7:
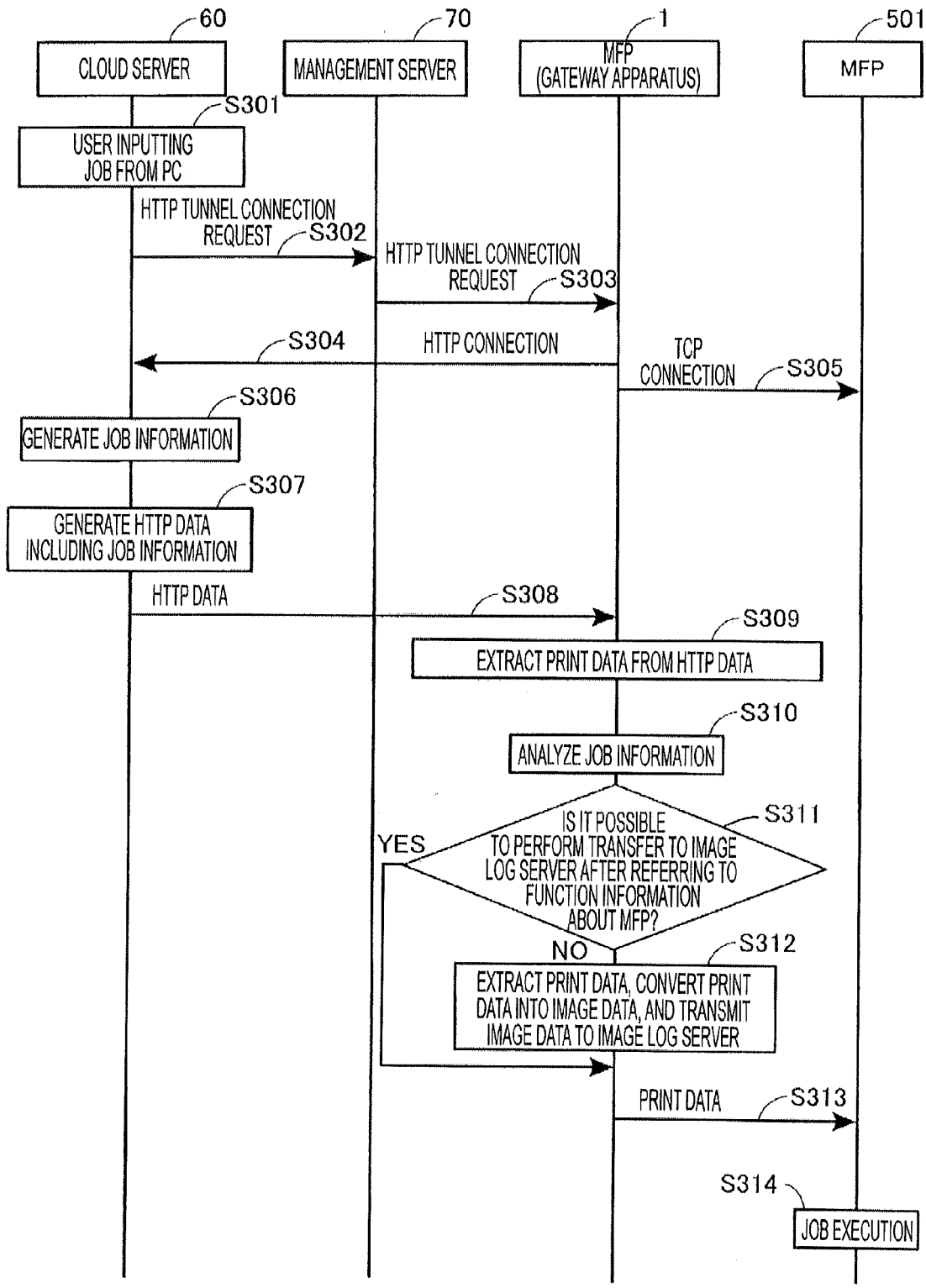
FIG. 7 is a sequence diagram showing the operation of the image forming system.

FIG. 7 is a sequence diagram showing the operation of the image forming system 10.

As shown in FIG. 7, when a user inputs a print job from a terminal such as a PC, the cloud server 60 receives the print job in step S301. In the example case described below, an instruction to execute a transfer job together with the print job is input.

In step S302, the cloud server 60 transmits an HTTP tunnel connection request to the management server 70.

In step S303, the management server 70 transmits the HTTP tunnel connection request to the gateway apparatus 1.

In step S304, the gateway apparatus 1 connects with the cloud server 60 by HTTP. As a result, communication via an HTTP tunnel can be conducted between the cloud server 60 and the gateway apparatus 1.

In step S305, the gateway apparatus 1 connects with the MFP 501 by TCP.

In step S306, the cloud server 60 generates job execution information (job information) to be transmitted to the MFP 501.

In step S307, the cloud server 60 generates HTTP data including the job execution information.

In step S308, the cloud server 60 transmits the HTTP data to the gateway apparatus 1.

In step S309, the gateway apparatus 1 extracts print data from the received HTTP data.

In step S310, the gateway apparatus 1 analyzes the job information from the HTTP data. Here, the content information included in the HTTP header of the HTTP data is analyzed.

In step S311, the gateway apparatus 1 refers to the function information about the MFP 501 serving as the transmission destination. The gateway apparatus 1 then determines whether the MFP 501 is capable of generating image data from the print data and transferring the image data to the log server 201, or determines whether the MFP 501 is capable of executing the transfer job.

If the MFP 501 is determined not to be capable of executing the transfer job in step S311, the gateway apparatus 1 in step S312 extracts the print data and converts the print data into the image data. The gateway apparatus 1 then transmits the image data to the log server 201.

When the processing in step S312 is performed, or if the MFP 501 is determined to be capable of executing the transfer job in step S311, the gateway apparatus 1 in step S313 transmits the print data to the MFP 501. If the MFP 501 is determined to be capable of executing the transfer job in step S311, the print log transfer request should be transmitted together with the print data.

In step S314, as the data is transmitted from the gateway apparatus 1 to the MFP 501, the MFP 501 executes the job in accordance with the data.

As described above, in this embodiment, the gateway apparatus 1 can recognize the contents of a job based on the content information in the header 2a. Accordingly, in a case where the MFP 501 cannot execute the job, appropriate processing can be performed. Specifically, in a case where a print job and a transfer job are to be executed in the image forming system 10, if the MFP 501 does not have the function to transfer an image log to the log server 201, the gateway apparatus 1 in place of the MFP 501 can transfer the image log.

The content information includes information that indicates the format of the image log with respect to the transfer job. Accordingly, the gateway apparatus 1 can convert the format of the image log into an appropriate one.

The content information also includes information about the location of the print data in the job execution information. Accordingly, the gateway apparatus 1 can identify and acquire the print data, without analyzing the job execution information in great detail.

[Modifications]

In the above described image forming system 10, if the gateway apparatus 1 determines that the MFP 501 as the job execution destination is not capable of executing a job, the gateway apparatus 1 may transmit information about another MFP (not shown) capable of executing the job in the intranet 92 to the management server 70.

Figure 8:
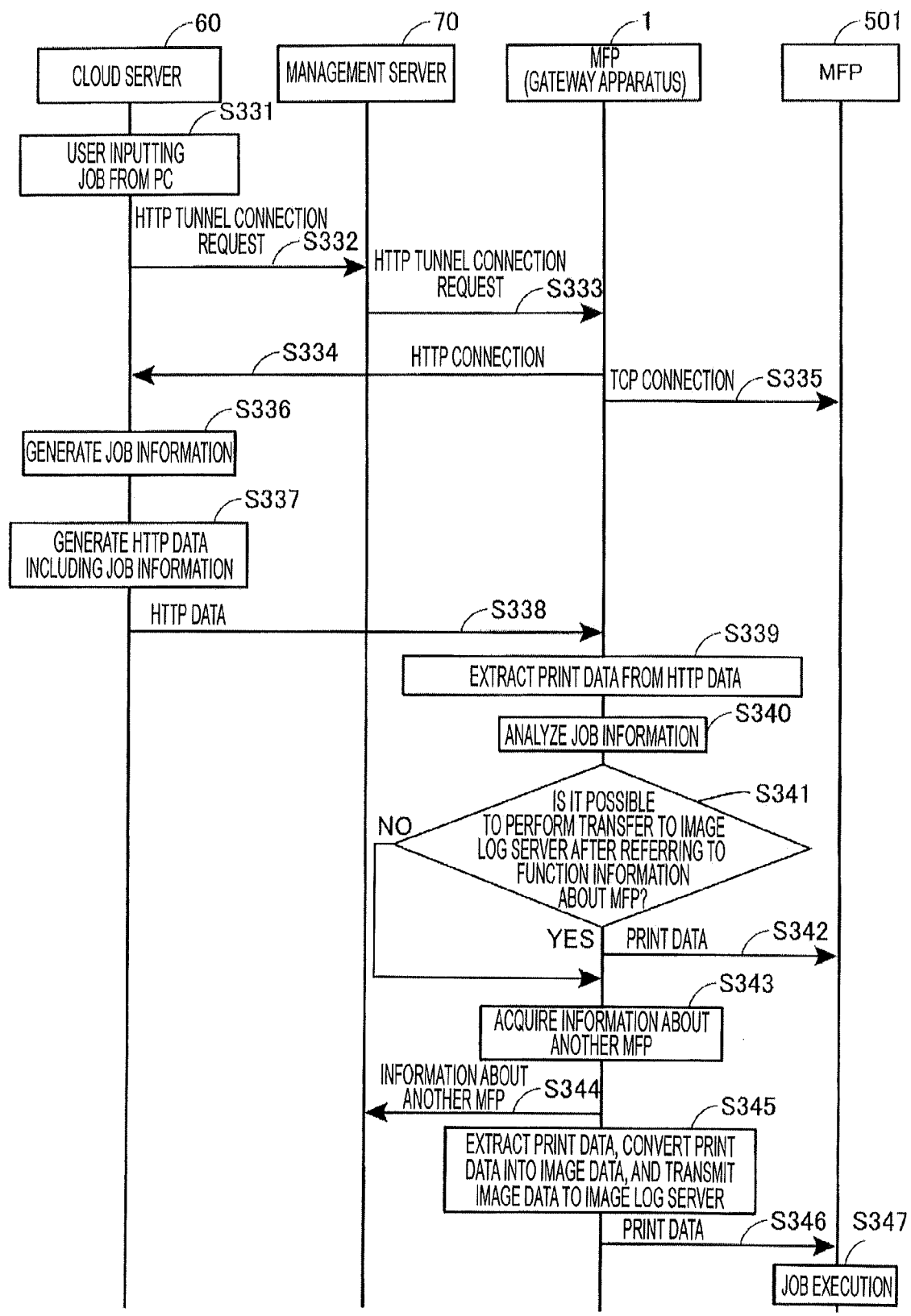
FIG. 8 is a sequence diagram showing the operation of an image forming system according to a modification of this embodiment.

FIG. 8 is a sequence diagram showing the operation of the image forming system 10 according to a modification of this embodiment.

In FIG. 8, the operation in steps S331 through S341 is the same as the operation in steps S301 through S311 in the above described embodiment. If the MFP 501 is determined to be capable of executing the transfer job in step S341, the print data and the print log transfer request are transmitted to the MFP 501 in step S342, and the MFP 501 executes the job in step S347.

If the MFP 501 is determined not to be capable of executing the transfer job in step S341, the gateway apparatus 1 in step S343 acquires information about another MFP capable of executing the transfer job.

In step S344, the gateway apparatus 1 transfers the acquired information about another MFP to the management server 70.

After that, in steps S345 through S347, the processing is performed at the gateway apparatus 1 and the MFP 501 in the same manner as in steps S312 through S314.

As described above, since the gateway apparatus 1 transmits the information about another MFP capable of executing the transfer job to the management server 70 in an operation related to the transfer job, the information about the MFP capable of executing the transfer job can be sent to the cloud server 60 through the management server 70. Accordingly, after the user terminal that is connected to the cloud server 60 at a later time and uses the application 61 is notified of the information about the MFP capable of executing the transfer job, a job execution instruction can be accepted.

The information about another MFP may be transmitted from the gateway apparatus 1 directly to the cloud server 60.

If the gateway apparatus 1 determines that the MFP 501 as the job execution destination is not capable of executing the transfer job, the gateway apparatus 1 may not execute the transfer jot, but another MFP capable of executing the transfer job may execute the job. That is, if the MFP 501 is determined not to be capable of executing the transfer job, the gateway apparatus 1 neither executes the transfer job nor transmits the print data, but transmits the information about another MFP to the management server 70. After that, the gateway apparatus 1 receives, from the application 61, re-designation of a job execution destination determined based on the transmitted information. The gateway apparatus 1 then transmits the print data and the like to the designated MFP based on the result of the reception, and the MFP executes the print job and the transfer job. In this manner, an MFP capable of appropriately executing the job can be made to execute the job.

[Other Aspects]

The content information is not necessarily included in the HTTP header. For example, the content information may be included in the HTTP body, the gateway apparatus may analyzes the HTTP body to acquire the content information, and may perform determination and operation based on the content information.

An MFP capable of executing a transfer job may be designed to execute a transfer job based on the content information written in the HTTP header.

The gateway apparatus may not be included in an MFP. That is, the gateway apparatus may be an apparatus that does not have an image formation function.

The present invention is not limited to a system or an apparatus or the like that executes a job related to a print log transfer function. For example, the present invention can be applied in a case where a billing job for billing the user every time printing is performed is executed together with a print job. Specifically, when both a print job and a billing job are to be executed, the MFP executing the print job may not be designed to execute the billing job. In such a case, billing job execution information (such as information indicating that the billing job is to be executed, and information about the charged amount and the billed user) may be included in the HTTP header, and, in place of the MFP, the gateway apparatus performing relayed communication may execute the billing job.

The image forming system is not limited to a system using a cloud server and the like, and may be a system that performs communication between a server and a device via a gateway apparatus in a client server system having a relatively simple configuration, or a system in which terminals communicate with each other via a gateway apparatus in a peer-to-peer network, for example. In such cases, if the gateway apparatus is made to function in the same manner as described above, the same effects as those described above can be achieved.

The hardware structures of the respective apparatuses constituting the image forming system are not limited to those described above. The respective apparatuses may be MFPs, for example, or may be computers or apparatuses to be used mainly for other purposes that involve computers.

The devices may be monochrome/color copying machines, printers, facsimile machines, or multi-function peripherals (MFPs) having the functions of those machines. The devices are not limited to devices that form images by electrophotography, but may be devices that form images by a so-called ink jet technology. The devices to be used in the image forming system in the present invention are not limited to image forming apparatuses. For example, the devices may be image processing devices that are used in various apparatuses, such as scanner devices that read image data, imaging devices, image data transmission/reception devices.

The processing in the above described embodiment may be performed by software, or may be performed with a hardware circuit.

A program for performing the processing in the above described embodiment can be provided, or the program may be recorded on a recording medium such as a CD-ROM, a flexible disk, a hard disk, a ROM, a RAM, or a memory card, and be provided to a user. The program may be downloaded into an apparatus via a communication network such as the Internet. The processing explained above with the flowcharts and text is performed by a CPU or the like in accordance with the program.

According to an embodiment of the present invention, a gateway apparatus determines whether an image processing apparatus is capable of executing a job based on content information acquired by analyzing job data, and executes an operation related to the job based on a result of the determination. Accordingly, it is possible to provide an image processing system in which an appropriate apparatus can be made to perform a predetermined process in accordance with information included in data being relayed by a gateway apparatus, and it is also possible to provide the gateway apparatus, a server apparatus, a method of controlling the gateway apparatus, a method of controlling the server apparatus, a program for controlling the gateway apparatus, and a program for controlling the server apparatus.

Although the present invention has been described and illustrated in detail, it is clearly understood that the same is by way of illustrated and example only and is not to be taken by way of limitation, the scope of the present invention being interpreted by terms of the appended claims. It should be understood that equivalents of the claimed inventions and all modifications thereof are incorporated herein.

What is claimed is:

1. An image processing system comprising:
a server apparatus connected to a first network;
an image processing apparatus connected to a second network; and
a gateway apparatus configured to connect the second network to the first network, perform mutual conversion between a first communication protocol being used in the first network and a second communication protocol being used in the second network, and relay communication between the server apparatus and the image processing apparatus, wherein
the server apparatus includes a first hardware processor configured to:
transmit job data of a job by the first communication protocol, the image processing apparatus being made to execute the job; and
add content information to the job data, the content information indicating contents of the job, and
the gateway apparatus includes a second hardware processor configured to:
analyze the job data and acquire the content information;
determine whether the image processing apparatus is capable of executing the job based on the content information; and
execute an operation related to the job based on a result of the determination performed by the hardware processor,
the image processing system further comprising:
a log server connected to one of the first network and the second network, wherein
the job includes a transfer job to transfer information about an image to the log server, the image being an image to be formed by the image processing apparatus, and,
when the image processing apparatus is not capable of executing the transfer job, the second hardware processor of the gateway apparatus acquires print data from the job data, transmits the acquired print data to the image processing apparatus, and transmits the print data or data corresponding to the print data to the log server.

2. The image processing system according to claim 1, wherein
the first communication protocol is HTTP (hypertext transfer protocol), and
the first hardware processor is configured to add the content information to an HTTP header of the job data.

3. The image processing system according to claim 1, wherein
the gateway apparatus further includes an image generator configured to generate image data from the print data,
the content information includes information about a format of the print data and a format of the image data to be generated,
the image generator generates the image data from the print data based on the content information, and
the second hardware processor transmits the image data generated by the image generator to the log server.

4. The image processing system according to claim 1, wherein
the content information includes information about a location of the print data in the job data, and
the second hardware processor acquires the print data from the job data based on the information about the location of the print data.

5. The image processing system according to claim 1, further comprising:
a management apparatus connected to the first network, wherein the second hardware processor of the gateway apparatus is further configured to establish an HTTP session connecting with the server apparatus and enable communication relay between the server apparatus and the image processing apparatus, when a communication start request is transmitted from the management apparatus.

6. The image processing system according to claim 1, wherein the gateway apparatus is an image forming apparatus having an image formation function.

7. The image processing system according to claim 1, wherein
the second hardware processor of the gateway apparatus is configured to acquire information about another image processing apparatus when the second hardware processor determines the image processing apparatus not to be capable of executing the job, the another image processing apparatus being connected to the second network and being capable of executing the job, and
the gateway apparatus comprises a transmitter configured to transmit the information acquired by the second hardware processor to one of a management apparatus and the server apparatus.

8. The image processing system according to claim 7, wherein the acquired information is transmitted to the management apparatus or the server apparatus connected to the first network, such that information is provided for selecting the another image processing apparatus capable of executing the job in a subsequent job execution instruction.

9. The image processing system according to claim 1, wherein the information about the image transferred to the log server includes information about the job to be executed in the image processing apparatus.

10. The image processing system according to claim 9, wherein the information about the image transferred to the log server includes a print log about the job to be executed in the image processing apparatus.

11. The image processing system according to claim 10, wherein the print log includes the print data or data corresponding to the print data.

12. The image processing system according to claim 11, wherein the print log includes image data corresponding to an image to be printed.

13. An image processing system comprising:
a server apparatus connected to a first network;
an image processing apparatus connected to a second network; and
a gateway apparatus configured to connect the second network to the first network, perform mutual conversion between a first communication protocol being used in the first network and a second communication protocol being used in the second network, and relay communication between the server apparatus and the image processing apparatus, wherein
the server apparatus includes a first hardware processor configured to:
transmit job data of a job by the first communication protocol, the image processing apparatus being made to execute the job; and
add content information to the job data, the content information indicating contents of the job, and
the gateway apparatus includes a second hardware processor configured to:
analyze the job data and acquire the content information;
determine whether the image processing apparatus is capable of executing the job based on the content information;
execute an operation related to the job based on a result of the determination performed by the hardware processor; and
acquire information about another image processing apparatus when the second hardware processor determines the image processing apparatus not to be capable of executing the job, the another image processing apparatus being connected to the second network and being capable of executing the job, and
the gateway apparatus comprising a transmitter configured to transmit the information acquired by the second hardware processor to one of a management apparatus and the server apparatus.

14. The image processing system according to claim 13, wherein
the first communication protocol is HTTP (hypertext transfer protocol), and
the first hardware processor is configured to add the content information to an HTTP header of the job data.

15. The image processing system according to claim 13, wherein
the job includes a transfer job to transfer information about an image to a log server connected to the first network or the second network, the image being to be formed by the image processing apparatus, and,
when the image processing apparatus is not capable of executing the transfer job, the second hardware processor of the gateway apparatus acquires print data from the job data, transmits the acquired print data to the image processing apparatus, and transmits the print data or data corresponding to the print data to the log server.

16. The image processing system according to claim 13, wherein
the gateway apparatus further includes an image generator configured to generate image data from the print data,
the content information includes information about a format of the print data and a format of the image data to be generated,
the image generator generates the image data from the print data based on the content information, and
the second hardware processor transmits the image data generated by the image generator to the log server.

17. The image processing system according to claim 13, wherein
the content information includes information about a location of the print data in the job data, and
the second hardware processor acquires the print data from the job data based on the information about the location of the print data.

18. The image processing system according to claim 13, further comprising:
the management apparatus connected to the first network,
wherein the second hardware processor of the gateway apparatus is further configured to establish an HTTP session connecting with the server apparatus and enable communication relay between the server apparatus and the image processing apparatus, when a communication start request is transmitted from the management apparatus.

19. The image processing system according to claim 13, wherein the gateway apparatus is an image forming apparatus having an image formation function.

20. The image processing system according to claim 13, wherein
the job includes a transfer job to transfer information about an image to a log server connected to the first network or the second network, the image being to be formed by the image processing apparatus.

21. The image processing system according to claim 20, wherein the information about the image transferred to the log server includes information about the job to be executed in the image processing apparatus.

22. The image processing system according to claim 21, wherein the information about the image transferred to the log server includes a print log about the job to be executed in the image processing apparatus.

23. The image processing system according to claim 22, wherein the print log includes the print data or data corresponding to the print data.

24. The image processing system according to claim 23, wherein the print log includes image data corresponding to an image to be printed.

25. The image processing system according to claim 13, wherein the acquired information is transmitted to the management apparatus or the server apparatus connected to the first network, such that information is provided for selecting the another image processing apparatus capable of executing the job in a subsequent job execution instruction.

26. A gateway apparatus that connects a second network to a first network, performs mutual conversion between a first communication protocol being used in the first network and a second communication protocol being used in the second network, and relays communication between a server apparatus connected to the first network and an image processing apparatus connected to the second network,
the gateway apparatus comprising a hardware processor configured to:
analyze job data transmitted from the server apparatus and acquire content information indicating contents of the job data;
determine whether the image processing apparatus is capable of executing the job based on the content information; and
execute an operation related to the job based on a result of the determination performed by the determining unit, wherein
a log server is connected to one of the first network and the second network,
the job includes a transfer job to transfer information about an image to the log server, the image being an image to be formed by the image processing apparatus, and
when the image processing apparatus is not capable of executing the transfer job, the hardware processor of the gateway apparatus acquires print data from the job data, transmits the acquired print data to the image processing apparatus, and transmits the print data or data corresponding to the print data to the log server.

27. The gateway apparatus according to claim 26, wherein the first communication protocol is HTTP (hypertext transfer protocol), and
the first hardware processor is configured to add the content information to an HTTP header of the job data.

28. The gateway apparatus according to claim 26, further comprising an image generator configured to generate image data from the print data, wherein
the content information includes information about a format of the print data and a format of the image data to be generated,
the image generator generates the image data from the print data based on the content information, and
the second hardware processor transmits the image data generated by the image generator to the log server.

29. The gateway apparatus according to claim 26, wherein
the content information includes information about a location of the print data in the job data, and
the second hardware processor acquires the print data from the job data based on the information about the location of the print data.

30. The gateway apparatus according to claim 26, wherein
a management apparatus is connected to the first network, and
the second hardware processor of the gateway apparatus is further configured to establish an HTTP session connecting with the server apparatus and enable communication relay between the server apparatus and the image processing apparatus, when a communication start request is transmitted from the management apparatus.

31. The gateway apparatus according to claim 26, wherein
the second hardware processor is configured to acquire information about another image processing apparatus when the second hardware processor determines the image processing apparatus not to be capable of executing the job, the another image processing apparatus being connected to the second network and being capable of executing the job, and
the gateway apparatus comprises a transmitter configured to transmit the information acquired by the second hardware processor to one of a management apparatus and the server apparatus.

32. The gateway apparatus according to claim 31, wherein the acquired information is transmitted to the management apparatus or the server apparatus connected to the first network, such that information is provided for selecting the another image processing apparatus capable of executing the job in a subsequent job execution instruction.

33. The gateway apparatus according to claim 26, wherein the gateway apparatus is an image forming apparatus having an image formation function.

34. The gateway apparatus according to claim 26, wherein the information about the image transferred to the log server includes information about the job to be executed in the image processing apparatus.

35. The gateway apparatus according to claim 34, wherein the information about the image transferred to the log server includes a print log about the job to be executed in the image processing apparatus.

36. The gateway apparatus according to claim 35, wherein the print log includes the print data or data corresponding to the print data.

37. The gateway apparatus according to claim 36, wherein the print log includes image data corresponding to an image to be printed.

38. A method of controlling a gateway apparatus that connects a second network to a first network, performs mutual conversion between a first communication protocol being used in the first network and a second communication protocol being used in the second network, and relays communication between a server apparatus connected to the first network and an image processing apparatus connected to the second network, a log server being connected to one of the first network and the second network,
the method comprising:
an analyzing step of analyzing job data transmitted from the server apparatus and acquiring content information indicating contents of the job data;
a determining step of determining whether the image processing apparatus is capable of executing the job based on the content information;
an executing step of executing an operation related to the job based on a result of the determination performed in the determining step;
transferring information about an image to the log server, the image being an image to be formed by the image processing apparatus; and acquiring, when the image processing apparatus is not capable of executing the transfer job, print data from the job data, transmitting the acquired print data to the image processing apparatus, and transmitting the print data or data corresponding to the print data to the log server.

39. The method according to claim 38, wherein
the first communication protocol is HTTP (hypertext transfer protocol), and
the method includes adding the content information to an HTTP header of the job data.

40. The method according to claim 38, further comprising
a generating step of generating image data from the print data, wherein the content information includes information about a format of the print data and a format of the image data to be generated,
a second generating step of generating the image data from the print data based on the content information, and
transmitting the image data generated by the image generator to the log server.

41. The method according to claim 38, wherein
the content information includes information about a location of the print data in the job data, and
the acquiring of the print data from the job data is based on the information about the location of the print data.

42. The method according to claim 38, wherein
a management apparatus is connected to the first network, and
the method includes establishing an HTTP session connecting with the server apparatus and enabling communication relay between the server apparatus and the image processing apparatus, when a communication start request is transmitted from the management apparatus.

43. The method according to claim 38, further comprising
acquiring information about another image processing apparatus when determining the image processing apparatus is not to be capable of executing the job, the another image processing apparatus being connected to the second network and being capable of executing the job, and
transmitting the information acquired to one of a management apparatus and the server apparatus.

44. The method according to claim 43, wherein the acquired information is transmitted to the management apparatus or the server apparatus connected to the first network, such that information is provided for selecting the another image processing apparatus capable of executing the job in a subsequent job execution instruction.

45. The method according to claim 38, wherein the gateway apparatus is an image forming apparatus having an image formation function.

46. The method according to claim 38, wherein the information about the image transferred to the log server includes information about the job to be executed in the image processing apparatus.

47. The method according to claim 46, wherein the information about the image transferred to the log server includes a print log about the job to be executed in the image processing apparatus.

48. The method according to claim 47, wherein the print log includes the print data or data corresponding to the print data.

49. The method according to claim 48, wherein the print log includes image data corresponding to an image to be printed.

50. A non-transitory computer-readable recording medium for controlling a gateway apparatus that connects a second network to a first network, performs mutual conversion between a first communication protocol being used in the first network and a second communication protocol being used in the second network, and relays communication between a server apparatus connected to the first network and an image processing apparatus connected to the second network, a log server being connected to one of the first network and the second network,
the non-transitory computer-readable recording medium encoded with a program causing a computer to carry out:
an analyzing step of analyzing job data transmitted from the server apparatus and acquiring content information indicating contents of the job data;
a determining step of determining whether the image processing apparatus is capable of executing the job based on the content information;
an executing step of executing an operation related to the job based on a result of the determination performed in the determining step;
a transferring step of transferring information about an image to the log server, the image being to be formed by the image processing apparatus; and
an acquiring step of acquiring, when the image processing apparatus is not capable of executing the transfer job, print data from the job data, transmitting the acquired print data to the image processing apparatus, and transmitting the print data or data corresponding to the print data to the log server.

51. The non-transitory computer-readable medium according to claim 50, wherein
the first communication protocol is HTTP (hypertext transfer protocol), and
the non-transitory computer-readable medium causes the computer to carry out adding the content information to an HTTP header of the job data.

52. The non-transitory computer-readable medium according to claim 50, further causing the computer to carry out:
a generating step of generating image data from the print data, wherein the content information includes information about a format of the print data and a format of the image data to be generated,
a second generating step of generating the image data from the print data based on the content information, and
transmitting the image data generated by the image generator to the log server.

53. The non-transitory computer-readable medium according to claim 50, wherein
the content information includes information about a location of the print data in the job data, and
the non-transitory computer-readable medium causes the computer to carry out acquiring of the print data from the job data based on the information about the location of the print data.

54. The non-transitory computer-readable medium according to claim 50, wherein
a management apparatus is connected to the first network, and
the non-transitory computer-readable medium causes the computer to carry out establishing an HTTP session connecting with the server apparatus and enabling communication relay between the server apparatus and the image processing apparatus, when a communication start request is transmitted from the management apparatus.

55. The non-transitory computer-readable medium according to claim 50, further causing the computer to carry out:
acquiring information about another image processing apparatus when determining the image processing apparatus is not to be capable of executing the job, the another image processing apparatus being connected to the second network and being capable of executing the job, and
transmitting the information acquired to one of a management apparatus and the server apparatus.

56. The non-transitory computer-readable medium according to claim 55, wherein the acquired information is transmitted to the management apparatus or the server apparatus connected to the first network, such that information is provided for selecting the another image processing apparatus capable of executing the job in a subsequent job execution instruction.

57. The non-transitory computer-readable medium according to claim 50, wherein the gateway apparatus is an image forming apparatus having an image formation function.

58. The non-transitory computer-readable medium according to claim 50, wherein the information about the image transferred to the log server includes information about the job to be executed in the image processing apparatus.

59. The non-transitory computer-readable medium according to claim 58, wherein the information about the image transferred to the log server includes a print log about the job to be executed in the image processing apparatus.

60. The non-transitory computer-readable medium according to claim 59, wherein the print log includes the print data or data corresponding to the print data.

61. The non-transitory computer-readable medium according to claim 60, wherein the print log includes image data corresponding to an image to be printed.

62. A gateway apparatus that connects a second network to a first network, performs mutual conversion between a first communication protocol being used in the first network and a second communication protocol being used in the second network, and relays communication between a server apparatus connected to the first network and an image processing apparatus connected to the second network,
the gateway apparatus comprising a hardware processor configured to:
analyze job data transmitted from the server apparatus and acquire content information indicating contents of the job data;
determine whether the image processing apparatus is capable of executing the job based on the content information;
execute an operation related to the job based on a result of the determination performed by the determining unit; and
acquire information about another image processing apparatus when the hardware processor determines the image processing apparatus not to be capable of executing the job, the another image processing apparatus being connected to the second network and being capable of executing the job, and
the gateway apparatus comprising a transmitter configured to transmit the information acquired by the hardware processor to one of a management apparatus and the server apparatus.

63. The gateway apparatus according to claim 62, wherein the first communication protocol is HTTP (hypertext transfer protocol), and
the hardware processor is configured to add the content information to an HTTP header of the job data.

64. The gateway apparatus according to claim 62, wherein the job includes a transfer job to transfer information about an image to a log server connected to the first network or the second network, the image being to be formed by the image processing apparatus, and
when the image processing apparatus is not capable of executing the transfer job, the hardware processor of the gateway apparatus acquires print data from the job data, transmits the acquired print data to the image processing apparatus, and transmits the print data or data corresponding to the print data to the log server.

65. The gateway apparatus according to claim 62, further comprising an image generator configured to generate image data from the print data; wherein
the content information includes information about a format of the print data and a format of the image data to be generated,
the image generator generates the image data from the print data based on the content information, and
the hardware processor transmits the image data generated by the image generator to the log server.

66. The gateway apparatus according to claim 62, wherein
the content information includes information about a location of the print data in the job data, and
the hardware processor acquires the print data from the job data based on the information about the location of the print data.

67. The gateway apparatus according to claim 62, further comprising:
the management apparatus is connected to the first network,
wherein the hardware processor of the gateway apparatus is further configured to establish an HTTP session connecting with the server apparatus and enable communication relay between the server apparatus and the image processing apparatus, when a communication start request is transmitted from the management apparatus.

68. The gateway apparatus according to claim 62, wherein the gateway apparatus is an image forming apparatus having an image formation function.

69. The gateway apparatus according to claim 62, wherein the job includes a transfer job to transfer information about an image to a log server connected to the first network or the second network, the image being to be formed by the image processing apparatus.

70. The gateway apparatus according to claim 69, wherein the information about the image transferred to the log server includes information about the job to be executed in the image processing apparatus.

71. The gateway apparatus according to claim 70, wherein the information about the image transferred to the log server includes a print log about the job to be executed in the image processing apparatus.

72. The gateway apparatus according to claim 71, wherein the print log includes the print data or data corresponding to the print data.

73. The gateway apparatus according to claim 72, wherein the print log includes image data corresponding to an image to be printed.

74. The gateway apparatus according to claim 62, wherein the acquired information is transmitted to the management apparatus or the server apparatus connected to the first network, such that information is provided for selecting the another image processing apparatus capable of executing the job in a subsequent job execution instruction.

75. A method of controlling a gateway apparatus that connects a second network to a first network, performs mutual conversion between a first communication protocol being used in the first network and a second communication protocol being used in the second network, and relays communication between a server apparatus connected to the first network and an image processing apparatus connected to the second network, the method comprising:
an analyzing step of analyzing job data transmitted from the server apparatus and acquiring content information indicating contents of the job data;
a determining step of determining whether the image processing apparatus is capable of executing the job based on the content information;
an executing step of executing an operation related to the job based on a result of the determination performed in the determining step;
an acquiring step of acquiring information about another image processing apparatus when the determining the image processing apparatus is not to be capable of executing the job, the another image processing apparatus being connected to the second network and being capable of executing the job; and
a transmitting step of transmitting the information acquired in the acquiring step to one of a management apparatus and the server apparatus.

76. The method according to claim 75, wherein
the first communication protocol is HTTP (hypertext transfer protocol), and
the method includes adding the content information to an HTTP header of the job data.

77. The method according to claim 75, further comprising:
transferring information about an image to a log server connected to the first network or the second network, the image being to be formed by the image processing apparatus; and
acquiring, when the image processing apparatus is not capable of executing the transfer job, print data from the job data, transmitting the acquired print data to the image processing apparatus, and transmitting the print data or data corresponding to the print data to the log server.

78. The method according to claim 75, further comprising:
a generating step of generating image data from the print data, wherein the content information includes information about a format of the print data and a format of the image data to be generated,
a second generating step of generating the image data from the print data based on the content information, and
transmitting the image data generated by the image generator to the log server.

79. The method according to claim 75, wherein
the content information includes information about a location of the print data in the job data, and
the acquiring of the print data from the job data is based on the information about the location of the print data.

80. The method according to claim 75, wherein
the management apparatus is connected to the first network, and
the method includes establishing an HTTP session connecting with the server apparatus and enabling communication relay between the server apparatus and the image processing apparatus, when a communication start request is transmitted from the management apparatus.

81. The method according to claim 75, wherein the gateway apparatus is an image forming apparatus having an image formation function.

82. The method according to claim 75, further comprising transferring information about an image to a log server connected to the first network or the second network, the image being to be formed by the image processing apparatus.

83. The method according to claim 82, wherein the information about the image transferred to the log server includes information about the job to be executed in the image processing apparatus.

84. The method according to claim 83, wherein the information about the image transferred to the log server includes a print log about the job to be executed in the image processing apparatus.

85. The method according to claim 84, wherein the print log includes the print data or data corresponding to the print data.

86. The method according to claim 85, wherein the print log includes image data corresponding to an image to be printed.

87. The method according to claim 75, wherein the acquired information is transmitted to the management apparatus or the server apparatus connected to the first network, such that information is provided for selecting the another image processing apparatus capable of executing the job in a subsequent job execution instruction.

88. A non-transitory computer-readable recording medium for controlling a gateway apparatus that connects a second network to a first network, performs mutual conversion between a first communication protocol being used in the first network and a second communication protocol being used in the second network, and relays communication between a server apparatus connected to the first network and an image processing apparatus connected to the second network, the non-transitory computer-readable recording medium encoded with a program causing a computer to carry out:
an analyzing step of analyzing job data transmitted from the server apparatus and acquiring content information indicating contents of the job data;
a determining step of determining whether the image processing apparatus is capable of executing the job based on the content information;
an executing step of executing an operation related to the job based on a result of the determination performed in the determining step;
an acquiring step of acquiring information about another image processing apparatus when determining the image processing apparatus is not to be capable of executing the job, the another image processing apparatus being connected to the second network and being capable of executing the job; and a transmitting step of transmitting the information acquired in the acquiring step to one of a management apparatus and the server apparatus.

89. The non-transitory computer-readable medium according to claim 88, wherein
the first communication protocol is HTTP (hypertext transfer protocol), and
the non-transitory computer-readable medium causes the computer to carry out adding the content information to an HTTP header of the job data.

90. The non-transitory computer-readable medium according to claim 88, wherein the non-transitory computer-readable recording medium further causes a computer to carry out:
a transferring step of transferring information about an image to a log server connected to the first network or the second network, the image being to be formed by the image processing apparatus; and
an acquiring step of acquiring, when the image processing apparatus is not capable of executing the transfer job, print data from the job data, transmitting the acquired print data to the image processing apparatus, and transmitting the print data or data corresponding to the print data to the log server.

91. The non-transitory computer-readable medium according to claim 88, further causing the computer to carry out:
a generating step of generating image data from the print data, wherein the content information includes information about a format of the print data and a format of the image data to be generated,
a second generating step of generating the image data from the print data based on the content information, and
transmitting the image data generated by the image generator to the log server.

92. The non-transitory computer-readable medium according to claim 88, wherein
the content information includes information about a location of the print data in the job data, and
the non-transitory computer-readable medium causes the computer to carry out acquiring of the print data from the job data based on the information about the location of the print data.

93. The non-transitory computer-readable medium according to claim 88, wherein
the management apparatus is connected to the first network, and
the non-transitory computer-readable medium causes the computer to carry out establishing an HTTP session connecting with the server apparatus and enabling communication relay between the server apparatus and the image processing apparatus, when a communication start request is transmitted from the management apparatus.

94. The non-transitory computer-readable medium according to claim 88, wherein the gateway apparatus is an image forming apparatus having an image formation function.

95. The non-transitory computer-readable medium according to claim 88, further causing the computer to carry out:
transferring information about an image to a log server connected to the first network or the second network, the image being to be formed by the image processing apparatus.

96. The non-transitory computer-readable medium according to claim 95, wherein the information about the image transferred to the log server includes information about the job to be executed in the image processing apparatus.

97. The non-transitory computer-readable medium according to claim 96, wherein the information about the image transferred to the log server includes a print log about the job to be executed in the image processing apparatus.

98. The non-transitory computer-readable medium according to claim 97, wherein the print log includes the print data or data corresponding to the print data.

99. The non-transitory computer-readable medium according to claim 98, wherein the print log includes image data corresponding to an image to be printed.

100. The non-transitory computer-readable medium according to claim 88, wherein the acquired information is transmitted to the management apparatus or the server apparatus connected to the first network, such that information is provided for selecting the another image processing apparatus capable of executing the job in a subsequent job execution instruction.

\* \* \* \* \*